United States Patent [19]

Fabbricante et al.

[11] Patent Number: 5,679,379
[45] Date of Patent: Oct. 21, 1997

[54] DISPOSABLE EXTRUSION APPARATUS WITH PRESSURE BALANCING MODULAR DIE UNITS FOR THE PRODUCTION OF NONWOVEN WEBS

[76] Inventors: Anthony S. Fabbricante; Thomas J. Fabbricante, both of 19 Hill Dr., Oyster Bay, N.Y. 11771; Gerald C. Najour, 6456 Rosecommon Dr., Norcross, Ga. 30096

[21] Appl. No.: 370,383

[22] Filed: Jan. 9, 1995

[51] Int. Cl.⁶ .................................................. B29C 39/22
[52] U.S. Cl. ...................... 425/7; 425/72.2; 425/192 S; 425/463; 425/464
[58] Field of Search ........................ 425/133.5, 131.5, 425/192 S, 72.2, 186, 463, 382.2, 7, 464; D16/217; 264/211.4

[56] References Cited

U.S. PATENT DOCUMENTS

| | | | |
|---|---|---|---|
| 2,031,387 | 2/1936 | Schwarz | 18/8 |
| 3,038,202 | 6/1962 | Harkenrider | 18/14 |
| 3,176,345 | 4/1965 | Powell | 18/8 |
| 3,178,770 | 4/1965 | Willis | 18/12 |
| 3,192,562 | 7/1965 | Powell | 425/131.5 |
| 3,192,563 | 7/1965 | Crompton | 18/8 |
| 3,204,290 | 9/1965 | Crompton | 425/DIG. 217 |
| 3,253,301 | 5/1966 | McGlaughlin | 18/8 |
| 3,380,128 | 4/1968 | Cremer et al. | 25/17 |
| 3,492,692 | 2/1970 | Soda et al. | 18/8 |
| 3,501,805 | 3/1970 | Douglas, Jr. et al. | 425/131.5 |
| 3,613,170 | 10/1971 | Soda et al. | 425/463 |
| 3,923,444 | 12/1975 | Esper et al. | 425/461 |
| 3,981,650 | 9/1976 | Page | 425/72 S |
| 4,185,981 | 1/1980 | Ohsato et al. | 65/5 |
| 4,457,685 | 7/1984 | Huang et al. | 425/461 |
| 4,652,225 | 3/1987 | Dehennau et al. | 425/188 |
| 4,746,283 | 5/1988 | Hoeson | 425/528 |
| 4,747,986 | 5/1988 | Chao | 425/198 |
| 4,812,276 | 3/1989 | Chao | 425/198 |
| 4,818,464 | 4/1989 | Lau | 264/510 |
| 5,013,232 | 5/1991 | Way | 425/192 |
| 5,017,116 | 5/1991 | Carter et al. | 425/192 S |
| 5,067,885 | 11/1991 | Stevenson et al. | 425/465 |
| 5,069,853 | 12/1991 | Miller | 264/285 |
| 5,094,792 | 3/1992 | Baran | 425/168 |
| 5,260,003 | 11/1993 | Nyssen et al. | 415/7 |
| 5,503,784 | 4/1996 | Balk | 264/40.3 |
| 5,521,921 | 5/1996 | Gill et al. | 156/62.4 |

FOREIGN PATENT DOCUMENTS 44-16168  7/1969  Japan ............................ 425/131.5

OTHER PUBLICATIONS

VanderWerf, P. et al., The Portland Cement Association's Guide to Concrete Homebuilding Systems, McGraw-Hill, Inc. (1995).

Primary Examiner—Thomas R. Weber

[57] ABSTRACT

The present invention relates to a die body consisting of a multiplicity of modular die plates, which are easily and rapidly interchangeable. The modular die plates can be configured to extrude different shapes and types of fibers. The apparatus may also be configured to extrude multiple types of materials each from a plurality of separate ports or from a plurality of common ports. The apparatus may also be designed to include single or multiple ports to direct air or other fluids to draw or attenuate the extrudate into fibers of a desired diameter. The extrudate may be treated with the air or various other gases or fluids within the die or exterior to the die tips.

9 Claims, 3 Drawing Sheets

DISPOSABLE EXTRUSION APPARATUS WITH PRESSURE BALANCING MODULAR DIE UNITS FOR THE PRODUCTION OF NONWOVEN WEBS

BACKGROUND OF THE INVENTION

1. Field of the Invention

The present invention relates to molten thermoplastic resin extrusion and particularly to an extrusion apparatus assembled from modular die units.

2. Description of the Prior Art

In the extrusion process a molten thermoplastic polymeric resin is directed through an extrusion die to form a fiber extrusion. Such fiber substrates may be oval, elliptical, square, rectangular, round, lobate, and the like in cross-section. The fiber extruded is typically continuous in length and of a constant cross section.

An extrusion die is typically made from a block of steel in which the various channels and die tips required for directing the flow of the molten polymer are machined or drilled. In order to reduce the degree of metal working needed, in many cases other machined blocks of steel are conjoined to the basic die body to carry the thermoplastic or other fluids required by the particular extrusion process. As extrusion dies grow larger and more complicated because of the use of multiple thermoplastic melts and drawing fluids, the complexity of machining increases geometrically as do the costs for manufacturing the die.

An additional factor that adds to the cost of using extrusion dies is the requirement that they be frequently cleaned of the residual deposits of carbonaceous matter that is created by the oxidation of the thermoplastics due to high temperature. This requires that additional dies be available for spares. Also dies have a limited life because of the erosion of the die tip tolerances due to the high temperatures and the wear of the fluids flowing through the dies under high pressures.

Numerous innovations of the extrusion die apparatus are described in the prior art for die design and construction. These innovations generally address specific individual purposes that are narrow in scope and application.

SUMMARY OF THE INVENTION

Accordingly, it is an object of the present invention to provide a modular extrusion die apparatus whereby specially shaped plates are confined in a repeating series to create a sequence of easily and economically manufactured modular die units which are contained in a die housing which is a frame or holding device that contains the modular structure and accommodates the design of the extrusion apparatus. The cost of a die produced from the present invention is less than 2 0% the cost of an equivalent die produced by traditional machining of a monolithic block. In addition, these modular die units can be easily removed for purposes of replacement, cleaning, or inserting a different shape die unit to produce another fiber configuration or fiber size.

The die housing construction can be mounted in a "fixed" or "spinning" structure to produce fibers. The modular die units can be clamped tight into die housing or another holding device or structure for easy insertion and removal. The die housing may contain heating elements and temperature sensing elements, such as thermocouple for purposes of heating and controlling temperatures of both the molten thermoplastic resin and housing. The heating elements may be contained within the modular plates.

The purpose of this fiber making die is to form continuous or discontinuous extruded fibers from any molten extrudable material. The apparatus is capable of forming fibers in a broad range of cross sections, such as from 2 to 100 microns, by adjusting process variables including, but not restricted, to temperature, pressure and air velocity.

DESCRIPTION OF THE INVENTION

The present invention is a novel method for manufacturing inexpensive modular extrusion dies for the extrusion of molten thermoplastic resins in sheets and fibers. It may also be used for melt blown and spun bond applications. The essence of the invention is the formation of modular die units using specially shaped plates which are combined in a repeating series to create a die which can be manufactured in any length and width required without complicated and expensive machining requirements. The design of each plate permits the inclusion of one or more die orifices for extruding polymer and one or more orifices or nozzles for directing the flow of the drawing fluid. These modular die units can be easily removed for purposes of replacement, cleaning or to insert a different shape die unit to produce another fiber configuration or fiber size.

The dimensions of the die tips or holes and air jets are controlled by varying the thicknesses of the primary and secondary plates that comprise the modular die units within the apparatus to produce different fiber sizes within the same die housing configuration. For example: assuming there are more than one row of die holes, the first row can have an opening equal to "X"; the second row equal to "Y"; etc. Similarly, varying modular die unit configurations can make different fiber sizes within the same operational manufacturing process.

The primary and secondary modular die plates can be easily installed into the die housing by alternating them in the required order and fixing them in place. The modular die plates can be clamped, bolted, brazed, riveted or welded and set into the die housing or the die segments can be loaded in a die housing for easy insertion and removal. The die housing construction can be mounted in a "fixed" or "spinning" structure.

The invention permits the openings in the modular die assembly to be arranged in closer proximity than in conventional construction of monolithic fiber extrusion dies. Consequently, this invention is capable of producing more fibers of varying shapes in a smaller area than current state of the art techniques. The segment cross sections, which produce the fibers, can vary in unlimited configurations and shapes.

This modular die construction is much less expensive to manufacture than conventional construction of monolithic fiber extrusion dies. Conventional or laser drilling, electron discharge machining are not necessary for making very small die holes.

The molten thermoplastic resin material enters the inlet port under the required pressure and temperature to move the material at the velocity necessary to force it through the cavities or channels formed by the juxtaposition of the modular die plates. An extruded fiber is formed as the material is forced under pressure through the modular die units and into the die holes or capillaries. When the fiber exits the die hole, a high velocity air stream forces the fiber to attenuate and form a fiber with the desired characteristics.

The die insert can be designed to have one or more air chambers separating the die segments, thereby permitting the use of two or more different molten thermoplastic resins of similar melt temperatures, which can be fiberized together. The fibers thus created are entangled and are bonded.

Molten thermoplastic resins, either of like or of different polymeric character, can enter two or more cavities separately from each other and can thus can be extruded separately in a sequential manner. For example, a cyclical sequence, molten thermoplastic resin "A" will run for one time, then shut off, and then molten thermoplastic resin "B" runs for another time period, which in turn shuts off. These cycles can vary in time or in combination with each other. For example, separate molten thermoplastic resins combine with each other, with one shutting off before the other. The variations are limitless, particularly in the manufacturing of filters, when fine fibers could be "laid down" first with a coarse fiber mixed in together, and finished off with a coarse fiber at the end of the cycle.

The present invention includes an additional method of making a die tip by designing the secondary plate so that it can be used as a primary plate by reversing alternate secondary plates, thus creating individual passageways. Also utilizing the same concept, and by specific design, many more passageways can be made. In this method, which eliminates the primary plate, the material to be produced flows through the top and inner chamber of the segment.

Accordingly, it is an object of the present invention to provide a modular die body extrusion apparatus. More particularly, it is an object of the present invention to provide a modular die extrusion apparatus in which the dies are easily removable and interchangeable. Additionally it is an object of the present invention to give a cost effective method for incorporating air nozzles for attenuating fibers as an integral part of the modular die unit.

In keeping with these objects, and with others which will become apparent hereinafter, one feature of the present invention resides, briefly stated, in the invention's ability to utilize both hot and cold extrudable materials.

In accordance with another feature of the present invention, the fibers may vary in thickness and configuration depending upon the modular die units used in the extrusion die.

Another feature of the present invention is that the modular die units may be mixed within one die housing, thus forming multiple, different types of fibers simultaneously upon extrusion.

Yet another feature of the present invention is that multiple, extrudable materials may be utilized simultaneously within the same extrusion die.

Still another feature of the present invention is that since multiple, extrudable, molten, thermoplastic resins and multiple extrusion die configurations may be used within one extrusion die housing, it is possible to have both different material fibers and different fiber configurations extruded from the die housing simultaneously.

Still yet another feature of the present invention is that the modular extrusion die may be free-spinning in order that the fibers intertwine after extrusion to form a fibrous mat. More particularly, the present invention relates to an extrusion apparatus with modular die units encased within a magazine which may be easily removed for replacement and disposal, cleaning and changing of the modular die units.

The novel features, which are considered characteristic for the invention, are set forth in particular in the appended claims. The invention itself, however, both as to its construction and its method of operation, together with additional objects and advantages thereof, will be best understood from the following description of the specific embodiments when read in connection with the accompanying drawings.

BRIEF DESCRIPTION OF THE DRAWINGS

These features, as well as others, shall become readily apparent after reading the following description in conjunction with the accompanying drawings in which.

LIST OF REFERENCE NUMERALS UTILIZED IN THE DRAWINGS

1—molten thermoplastic resin
2—slot
3—secondary die plate
4—primary die plate
5—orifice
6—lateral cavity
7—fibrous form of molten thermoplastic resin
8—primary die plate of second embodiment
9—secondary die plate of second embodiment
10—parallel lateral cavities
11—primary die plate of third embodiment
12—secondary die plate of third embodiment
13—air or fluid
14—separate or isolated channels
15—slots
16—exit orifices or nozzles
17—resin channel
18—primary die plate of fourth embodiment
19—secondary die plate of fourth embodiment

DETAILED DESCRIPTION OF THE PREFERRED EMBODIMENT

Figure 1:
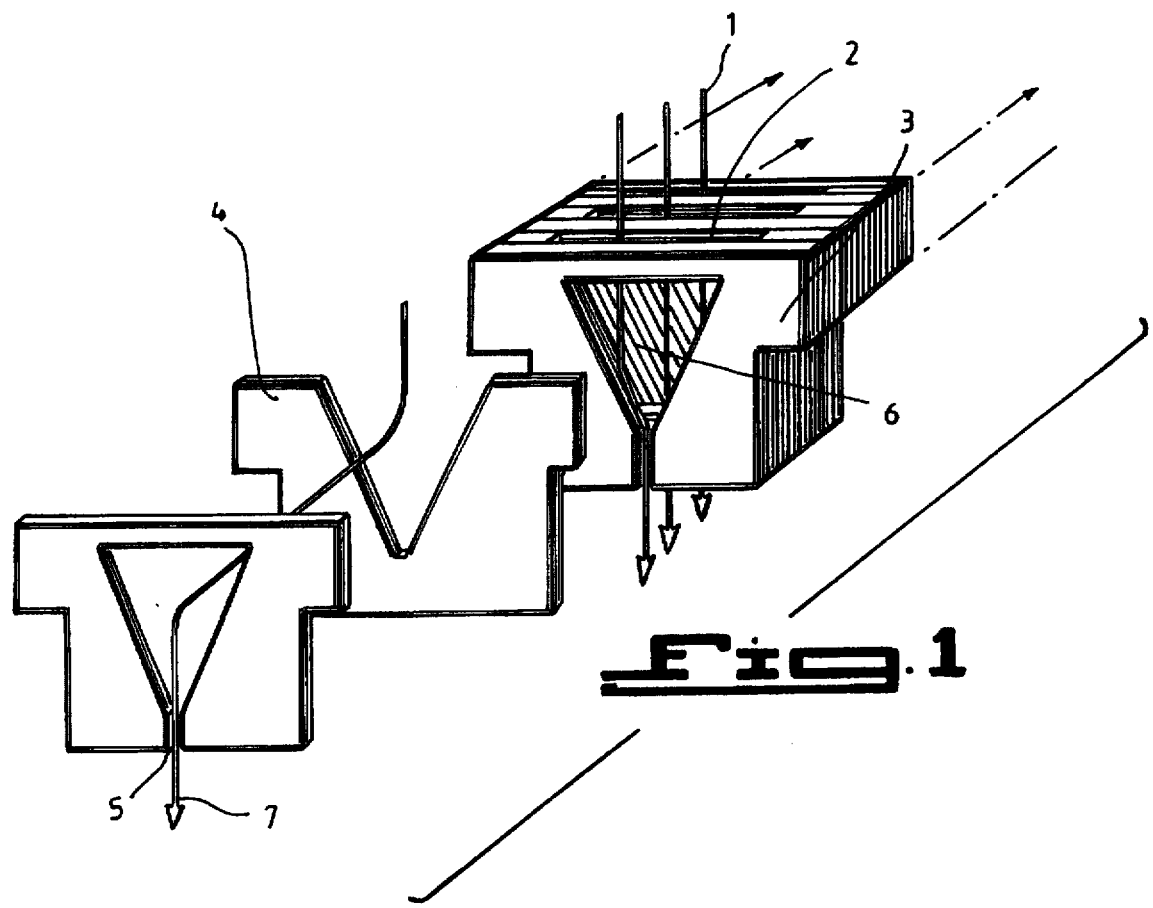
FIG. 1 is a perspective view illustrating the embodiment of a simple primary and secondary plate modular die, showing the arrangement of the plates and the flow of the molten thermoplastic resin into and through the modular die into a single die tip.

Referring to FIG. 1 of the drawings, a modular die plate assembly is formed by the alternate juxtaposition of primary die plate of first embodiment 4 and secondary die plate of first embodiment 3 in a continuing sequence. A fiber-forming, molten, thermoplastic resin 1 is forced under extruder pressure into the slot 2 formed by primary die plate of first embodiment 4 and secondary die plate of first embodiment 3. The molten thermoplastic resin 1, still under pressure, is then free to spread uniformly across the lateral cavity 6 formed by the alternate juxtaposition of primary die plate of first embodiment 4 and secondary die plate of first embodiment 3 is a continuing sequence. The molten thermoplastic resin 1 is then extruded in a fibrous form of molten thermoplastic resin 7 through the orifice 5 formed by the juxtaposition of the primary die plate of first embodiment 4 on either side of the slot 2 in lower surface of secondary plate 3. The size of the orifice 5 that is formed is a function of the width of the slot 2 and the thickness of the secondary die plate of first embodiment 3. A series of secondary die plates of first embodiment 3, each with a slightly different slot 2 shape, can also be used for a single orifice, resulting in an orifice 5 cross section which can be square, rectangular, elliptical, round or multilobal.

Figure 2:
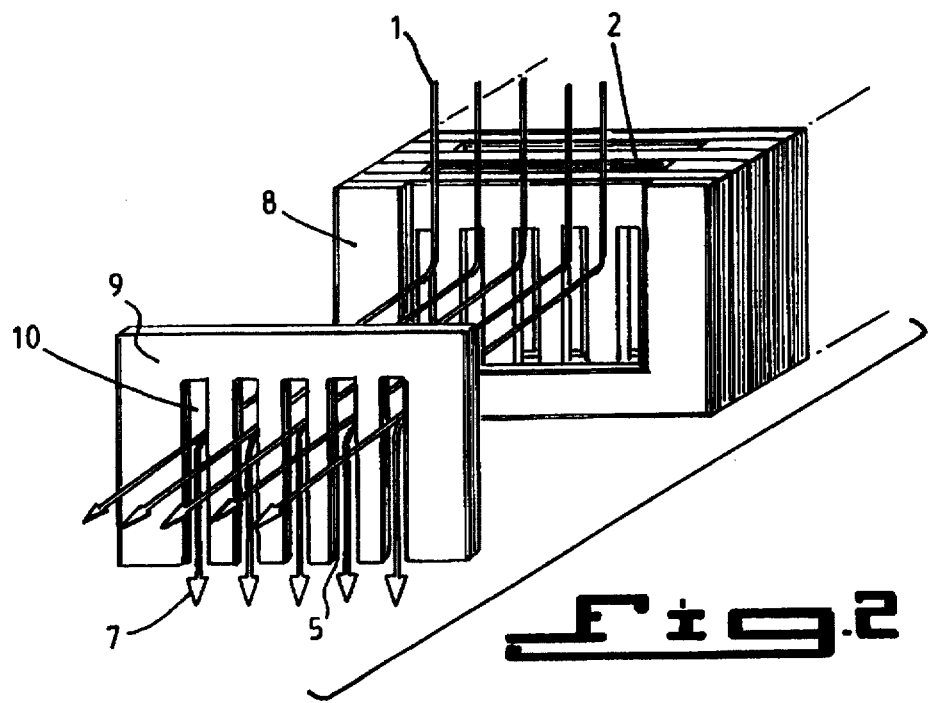
FIG. 2 is a perspective view illustrating the embodiment of a simple primary and secondary plate modular die, showing the arrangement of the plates and the flow of the molten thermoplastic resin into and through the modular die into multiple die tips.

An alternative embodiment is shown in FIG. 2 wherein the modular die plate assembly is formed by the alternate juxtaposition of primary die plate 8 and secondary die plate 9 in a continuing sequence. A fiber-forming, molten thermoplastic resin 1 is forced under extruder pressure into the slot 2 formed by primary die plates of second embodiment 8 and secondary die plate of second embodiment 9. In this alternative embodiment the secondary die plate of second embodiment 9 is designed to contain two or more slots 2 communicating with the lower edge. These multiple slots 2 form a series of parallel lateral cavities 10 by the alternate juxtaposition of primary die plate of second embodiment 8 and secondary die plate of second embodiment 9 in a continuing sequence. The molten thermoplastic resin is then free to spread uniformly through the multiple cavities 6 and is then extruded in a fibrous form 7 through the multiple orifices 5 formed by the juxtaposition of the primary die plate of the second embodiment 8 on either side of the multiple slots in the lower surface of secondary die plate of second embodiment 9.

Figure 3:
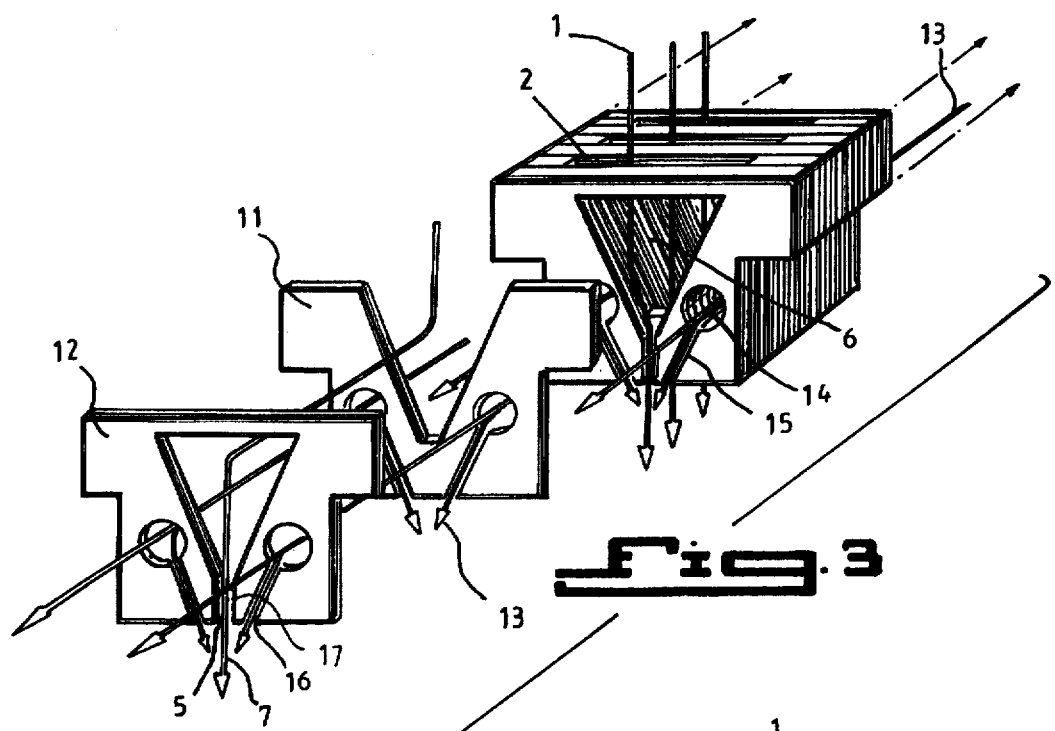
FIG. 3 is a perspective view illustrating the embodiment of a simple primary and secondary plate modular die, showing the arrangement of the plates where there is both a molten thermoplastic resin flow and an air flow through the modular die into a single die tip.

Referring to FIG. 3 of the drawings, a modular die plate assembly is formed by the alternate juxtaposition of the primary die plate of third embodiment 11 and the secondary die plate of third embodiment 12 in a continuing sequence. A fiber-forming, molten thermoplastic resin 1 is forced under extruder pressure into the slot 2 formed by primary die plate of third embodiment 11 and secondary die plate of third embodiment 12. The molten, thermoplastic resin 1, still under pressure, is then free to spread uniformly across the lateral cavity 6 formed by the alternate juxtaposition of primary die plate of third embodiment 11 and secondary die plate of third embodiment 12 in a continuing sequence. The molten, thermoplastic resin 1 is then extruded in a fibrous form 7 through the orifice 5 formed by the juxtaposition of the primary die plate of third embodiment 11 on either side of the slot in lower surface of secondary die plate of third embodiment 12.

To accommodate the flow of the drawing (attenuating) air or fluid 13, one or more separate and isolated channels 14 with slots 15 and exit orifices or nozzles 16 are placed laterally to each resin channel 17 in either the primary die plate of third embodiment 11 or secondary die plate of third embodiment 12, or both the primary die plate of third embodiment 11 and secondary die plate of third embodiment 12.

Figure 4:
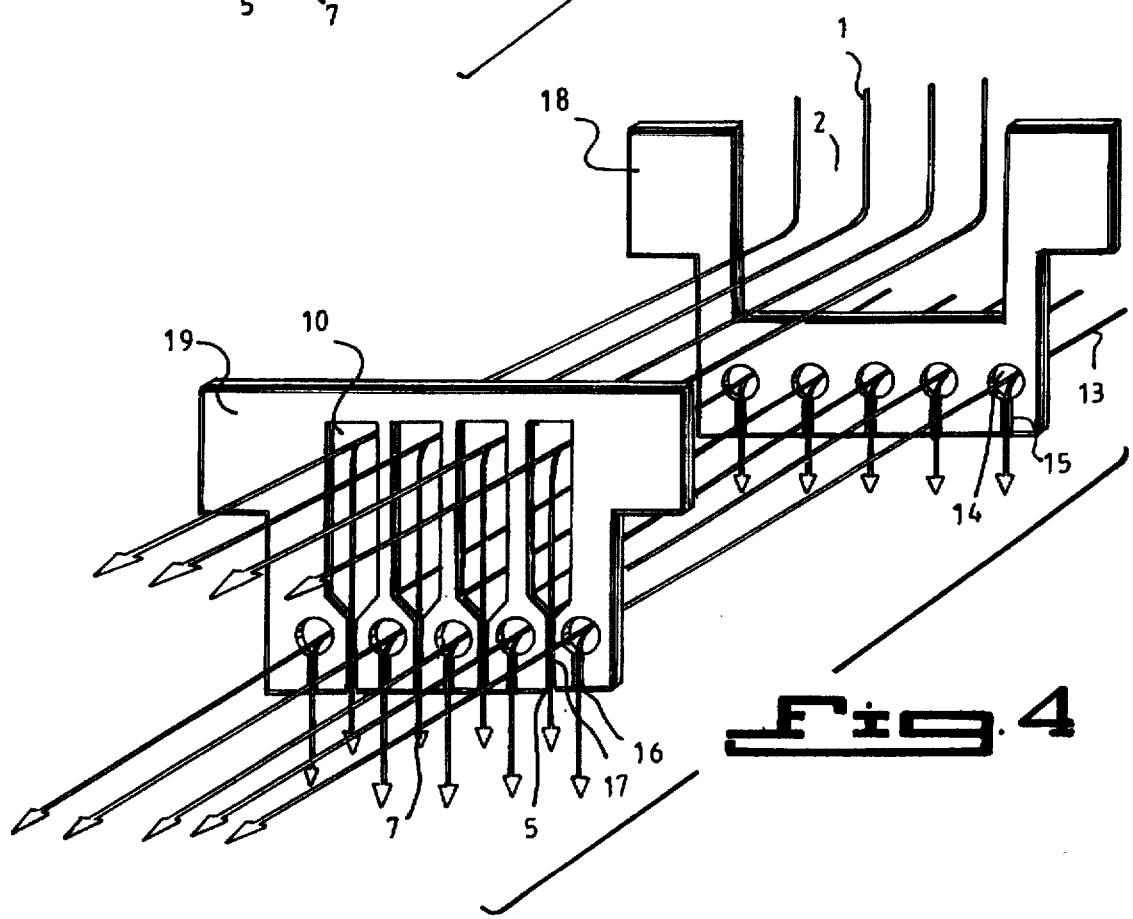
FIG. 4 is a sectional view illustrating the embodiment of a simple primary and secondary plate modular die, showing the arrangement of the plates where there is both a molten thermoplastic resin flow and an air flow through the modular die into multiple die tips.

Referring to FIG. 4 a modular die plate assembly is formed by the alternate juxtaposition of the primary die plate of fourth embodiment 18 and the secondary die plate of fourth embodiment 19 in a continuing sequence. A fiber-forming, molten thermoplastic resin 1 is forced under extruder pressure into two or more slots 2 formed by primary die plate of fourth embodiment 18 and secondary die plate of fourth embodiment 19. The molten, thermoplastic resin is then free to spread uniformly across the lateral cavities 10 formed by the alternate juxtaposition of primary die plate of fourth embodiment 18 and secondary die plate of fourth embodiment 19 in a continuing sequence. The molten thermoplastic resin 1 is then extruded in a fibrous form 7 through the multiple orifices 5 formed by the juxtaposition of the primary die plate of fourth embodiment 18 on either side of the slot in lower surface of secondary die plate of fourth embodiment 19. To accommodate the passage of the drawing (attenuating) air or fluid 13, one or more separate and isolated channels 14 with slots 15 and exit orifices 16 are placed laterally to each resin channel 17 in either the primary die plate of fourth embodiment 18 or secondary die plate of fourth embodiment 19, or both the primary die plate of fourth embodiment 18 and secondary die plate of fourth embodiment 19.

The result is a matrix of air nozzles and melt orifices where their separation is a function of the slot design and secondary plate(s) thickness. The invention presents the ability to extend the air and melt nozzle matrix a virtually unlimited distance in the lateral and axial directions.

Figure 5:
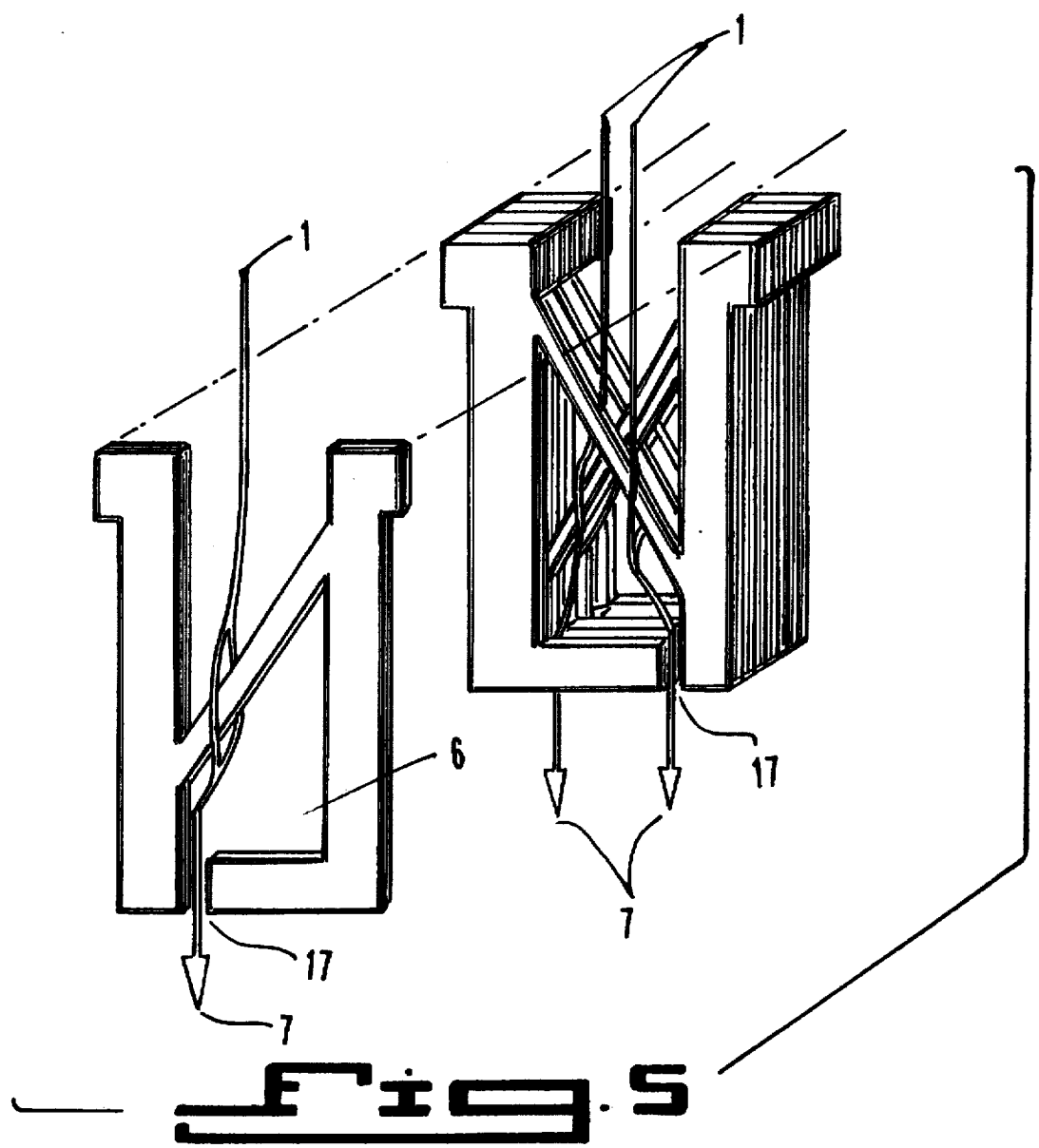
FIG. 5 is a sectional view showing the embodiment of a simple primary and secondary plate modular die illustrating the arrangement of the plates where the primary plate is alternately reversed to act as a secondary plate.

An alternative embodiment is shown in FIG. 5 wherein a single primary die plate is designed to serve as both the primary and secondary die plate by alternately reversing the primary plate to act as a secondary plate.

It will be understood that each of the elements described above, or two or more together, may also find a useful application in other types of constructions differing from the type described above.

While the invention has been illustrated and described as embodied in an extrusion apparatus with modular die units, it is not intended to be limited to the details shown, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the essence of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A disposable modular extrusion die body for extruding fibers from molten, synthetic, thermoplastic, polymeric resins comprising;
   (a) a stack of alternating primary and secondary die plates;
   (b) said primary and secondary die plate having :aligned top and bottom edges separated by no more than 0.15 meters;
   (c) each of said primary and secondary die plates having a central opening there through, the central openings in said die plates communicating with each other to form a single continuous pressure equalization chamber within said die body extending through a central region of said die body;
   (d) the top edge of each said primary die plate having an opening to receive molten polymeric resin, said opening communicating with said chamber permitting said polymeric resin to enter said chamber wherein each orifice is equidistant from the feed manifold;

(e) a top surface of said die body wherein the total area of the openings on said top surface is at least forty percent of the total area described by the width of the opening and length measured across all of the primary and secondary die plates;

(f) the bottom edge of each said secondary die plate having an extrusion slot extending to said chamber, the adjacent primary die plates forming with said extrusion slot an orifice for the extrusion of said polymer resin.

(g) a means for delivering a stream of fluid adjacent each said orifice comprising a passage way extending the length of said die body passing through all of said die plates, and a channel in each said secondary plate from said passageway to and terminating at the bottom edge of said secondary plate in a nozzle for delivering said fluid adjacent the extrude resin;

(h) an equalization chamber segment formed by and within each combination of adjacent primary and secondary plates which has a volume of at least 2,000 times and no more than 40,000 times the volume of the orifice:

(i) a means to maintain the multiplicity of modules in sealed alignment with each other.

2. The disposable modular extrusion die body of claim 1 wherein the secondary die plate has more than one shaped slot providing communication between the pressure equalization chamber to the lower plate edge and provides a series of lateral orifices equal in number to the number of slots.

3. The disposable modular extrusion die body of claim 1 in which said nozzles direct the stream of fluid at the extruded resin leaving said extrusion orifice.

4. The disposable modular extrusion die body of claim 1 wherein the primary plates and secondary plates have identical cross sections and where the primary plate is alternately reversed to act as a secondary plate.

5. The disposable modular extrusion die body of claim 1 wherein the width of the secondary plate is at least 0.001 inches and no greater than 0.200 inches.

6. The disposable modular extrusion die body of claim 1 where the primary and secondary plates have means for extruding multiple molten fluids consisting of different polymeric resins.

7. The disposable modular extrusion die body of claim 1 wherein the polymeric resins used have an apparent melt viscosity in the die tip ranging from about 500 poise to about 3000 poise.

8. The disposable modular extrusion die body of claim 1 where the primary and secondary plates are formed from steel, copper, aluminum, nickel, titanium and their various commercial alloys.

9. The disposable modular extrusion die body of claim 1 where the length of the die body is greater than 0.1 meters.

* * * * *